United States Patent Office 3,822,138
Patented July 2, 1974

3,822,138
LOW SHRINKAGE WAX COMPOSITION FOR INVESTMENT CASTING
Kazuo Noguchi, Yutaka Ueda, and Satoshi Inada, Tokyo, Japan, assignors to Kureha Kegaku Kogyo Kabushiki Kaisha, Tokyo, Japan
No Drawing. Filed Sept. 18, 1972, Ser. No. 289,602
Claims priority, application Japan, Sept. 18, 1971, 46/72,116
Int. Cl. B28b 7/34; C08h 9/06
U.S. Cl. 106—38.8      3 Claims

ABSTRACT OF THE DISCLOSURE

A novel wax composition for use in investment casting by the "lost wax" process. The novel wax composition contains hollow carbon microspheres and a conventional molding wax. It may additionally contain a rosin and/or an amide. The composition is characterized by low shrinkage, exhibiting only a small volume change in transition between the solid state and liquid state.

BACKGROUND OF THE INVENTION

An important requirement for a wax composition to be used as a pattern material for high precision applications is that it must exhibit low shrinkage as the pattern cools from the injection temperature, at which the wax is liquid or semi-solid, to the ambient temperature at which patterns are usually employed to make the refractory molds. However, conventional molding waxes exhibit marked changes in volume as they pass through their respective melting points, making it difficult to maintain the wax patterns to the dimensional accuracy required.

Another characteristic that is desirable for investment casting waxes is that the wax composition have a low ash content. If the wax composition, when melted out of the ceramic investment, leaves behind ash, the ash deposits cause imperfections in the surface of the metal reproduction.

It is common practice to use finely divided solid filler materials as components of the pattern wax materials in order to reduce the shrinkage of the resultant wax patterns. However, such filler materials tend to separate from the melted wax due to differences in density between the wax and the filler material. The filler materials also tend to excessively increase the viscosity of the melted composition. Additionally, some filler materials have undesirable thermal expansion characteristics. Other conventional filler materials have undesirably low melting points.

SUMMARY OF THE INVENTION

It has now been discovered that when hollow carbon microspheres are added to a conventional investment casting wax, the above-described problems are substantially overcome.

Accordingly, it is an object of the present invention to provide a wax investment composition having low shrinkage characteristics.

It is a further object of the present invention to provide a filler for a wax investment composition having a high melting point, low thermal expansion, and ability to form a stable suspension in the wax melt.

Other objects and advantages of the present invention will become apparent from the detailed description to follow taken in conjunction with the appended claims.

DESCRIPTION OF THE PREFERRED EMBODIMENTS

The carbon filler used in the present invention is in the form of hollow microspheres having particle sizes of 10–300$\mu$. The method for preparing the hollow carbon microspheres is fully disclosed in U.S. Application, Ser. No. 147,712, filed May 27, 1971, now U.S. Pat. No. 3,786,134, the teachings of which are hereby incorporated by reference. These hollow carbon microspheres are lipophilic, have low thermal expansion coefficients, are flame resistant, and have low ash content. The physical properties of the hollow carbon microspheres and various types of prior art fillers for waxes are shown in Table 1.

TABLE 1

| | Density, g./cc. | Thermal expansion coefficient, $\times 10^{-5}$, cm./cm./° C. | Melting point (deformation temperature) ° C. |
|---|---|---|---|
| Polyethylene | 0.9 | 10–20 | 130 (60–70) |
| Polystyrene | 0.8 | 6–9 | 230 (70–90) |
| Nylon | 1.1 | 10 | 215 (140) |
| Acrylic resin | 1.2 | 5–7 | 160 (70–85) |
| Amorphous carbon powder | 2.0 | 0.3 | No |
| Hollow microsphere carbon | 0.4–1.2 | 0.7 | No |

As is apparent from the above table, the thermal expansion of the resin additives is very high as compared with that of carbon, and the melting points of the resin additives are too low to be practical for use as additives in wax molding compositions.

Another advantage of the filler of the present invention is that the carbon is in the form of a sphere so that when the hollow microspheres are added to a wax, the increase in the viscosity of the wax is small. In this connection, Table 2 shows the variations in viscosity of a wax to which a hollow carbon microsphere and amorphous carbon powders are separately added in varying amounts.

TABLE 2

| Amount added (percent by weight) | Hollow microsphere carbon, cps. | Amorphous carbon power cps. |
|---|---|---|
| 0 | 20 | 20 |
| 20 | 40 | 40 |
| 30 | 90 | 100 |
| 40 | 320 | 760 |
| 45 | 750 | 2,000 |
| 50 | 3,200 | |

It will be understood from the above table that the increase in viscosity of the wax to which hollow carbon microspheres have been added is smaller than that of the wax to which the amorphous carbon powder was added in like amounts.

Moreover, the hollow microspherical carbon is lipophilic so that when added to a melted wax, the hollow microspherical carbon forms a stable suspension in the wax. This phenomenon is somewhat surprising in view of the fact that it is commonly thought that the tendency toward separation of the additive from the wax increases with an increase in the difference in density between the two materials. The hollow microspherical carbon has a density within the range of 0.4–1.2 g./cc., and accordingly the maximum difference in density between the hollow microspherical carbon and the melted wax reaches 0.4 g./cc. In spite of such a large density difference between the hollow microspherical carbon and the wax, the hollow microspherical carbon is difficult to separate from the wax, this is attributed to the lipophilic nature of carbon. The apparent density of each particle of the hollow microsphere carbon used in the present invention is preferably within the range of 0.7–1.1 g./cc. In this density range, substantially no separation occurs between the melted wax and the hollow microspherical carbon. In practice, the separation velocity of the melted wax and the hollow miscrospherical carbon is an important factor. It has been discovered that the separation velocity is markedly affected by the particle size of the hollow microspherical carbon used. It has been discovered that a particle size of 10–300$\mu$ is suitable. The separation velocity between the wax and the hollow microsphere carbon becomes lower as the viscosity of the mixture increases. The viscosity of the melted wax composition is increased as the amount of hollow microspherical carbon added is increased. When the amount of the hollow microspherical carbon in the mixture is less than 20% by volume of the wax, a separation occurs between the microspheres and the melted wax. On the other hand, the fluidity of the melted wax becomes objectionably low and the viscosity thereof becomes excessively high if the amount of microspheres added to the melted wax exceeds about 60% by volume of the wax. When the amount reaches 70% by volume, the wax shows substantially no fluidity. Accordingly, the amount of the hollow carbon microspheres used in the present invention should be within the range of 20–60% by volume of the wax used.

The hollow microspheres may be preliminarily added to the melted wax and uniformly dispersed, the composition solidified and stored. Alternatively, the hollow microsphere carbon may be added to the melted wax at the time of formation of the wax mold. It should be understood that the term "wax composition," as used in the present claims, includes a melted wax to which a hollow microsphere carbon has been added for forming a wax mold.

The waxes used in the present invention may be commercially available molding waxes such as petroleum waxes, candelilla wax, carnauba wax, bees wax and mixtures thereof. Generally, it is preferable to use a mixture of two or more of these waxes. Optionally, an additive such as a rosin, an amide or the like may be added to the wax composition.

EXAMPLE 1

Hollow microspherical carbon was added to a wax (M–2, produced by Nihon Kayaku K. K.) up to 50% by volume. A predetermined amount of the hollow microspherical carbon having an average particle size of 100$\mu$ and a particle density of 0.8 g./cc. was added to the wax which had preliminarily been heated to 100° C. The resultant mixture was introduced into a mold having the dimensions of 30 x 30 x 150, heated to 60° C., and molded under a pressure of 1 kg./cm. for 10 min. The mold was then allowed to cool to room temperature. The pattern dimensions were measured and the contraction of the mixture was calculated according to the following equation:

Contraction Coefficient of Solidification
$$=\frac{\text{Volume of Mold} - \text{Volume of Pattern}}{\text{Volume of Mold}} \times 100$$

The relationship between the amount of microspheres added and the contraction coefficient of the wax mold obtained is shown in Table 3 below. As is apparent from Table 3, when 40% by volume of hollow microspherical carbon is added to the wax, the contraction coefficient for solidification of the wax mixture is reduced to about ¼ of that of the wax alone.

The thermal expansion coefficients (room temperature to 58° C.) of the wax molds obtained are also shown in Table 3. From Table 3, it will be understood that the thermal expansion is considerably reduced by the addition of the hollow microspherical carbon.

TABLE 3

| Amount of added hollow microsphere carbon percent by volume | Contraction coefficient by solidification, percent | Thermal expansion coefficient, $\times 10^{-4}$ cm./cm./°C. |
|---|---|---|
| 0 | 1.17 | 5.1 |
| 10 | 0.66 | 2.2 |
| 20 | 0.56 | 2.3 |
| 30 | 0.40 | 1.8 |
| 40 | 0.31 | 1.5 |
| 50 | 0.25 | 1.4 |

EXAMPLE 2

Example 1 was repeated except that 40% by volume of each of two different hollow microspherical carbons, one type having an average particle size of 50$\mu$ and a density of 0.76 g./cc., and the other type having an average particle size of 100$\mu$ and a density of 1.02 g./cc. were added to a wax. The properties of the resultant wax compositions are summarized in Table 4.

TABLE 4.—PROPERTIES OF WAX COMPOSITIONS CONTAINING HOLLOW MICROSPHERICAL CARBON

| Additive | No | Yes | Yes |
|---|---|---|---|
| Particle, size, $\mu$ | | 50 | 100 |
| Particle density, g./cc. | | 0.76 | 1.02 |
| Added amount, percent by volume | | 40 | 40 |
| Fluidity limit, percent by volume | | 60 | 60 |
| Wax separation, 100° C. for 10 min. (percent) | | 0 | 0 |
| Viscosity (90° C.) cps | 20 | 300 | 320 |
| Effluent amount (100° C.), percent by weight | 99.9 | 99.2 | 99.3 |
| Contraction coefficient for solidification | 1.17 | 0.23 | 0.30 |
| Thermal expansion coefficient (room temperature to 58° C.), cm./cm./°C.$\times 10^{-4}$ | 5.03 | 1.60 | 1.57 |
| Bending (35° C.) | No | No | No |
| Compressive strength, kg./cm.² | 0.9 | 1.7 | 1.5 |
| Specific gravity, g./cc. | 0.95 | 0.86 | 1.00 |
| Ash content | 0.02 | 0.03 | 0.21 |

What is claimed is:

1. A low shrinkage wax composition for investment molding comprising wax and hollow microspherical carbon having a particle density of 0.4–1.2 g./cc. and a particle size of 10–300$\mu$ in an amount of 20–60% by volume of said wax.

2. The wax composition of claim 1, wherein said wax is a member selected from the group consisting of petroleum waxes, candelilla wax, carnauba wax, bees wax, and mixtures thereof.

3. The wax composition of claim 1, further comprising an additive selected from the group consisting of rosins and amides.

References Cited
UNITED STATES PATENTS

| | | | |
|---|---|---|---|
| 3,353,974 | 11/1967 | Trimble et al. | 106—272 |
| 3,600,202 | 8/1971 | MacLeod | 106—38.8 |
| 3,607,332 | 9/1971 | Wingfield | 106—272 |
| 3,655,414 | 4/1972 | Hoffman et al. | 106—38.8 |

LORENZO B. HAYES, Primary Examiner

U.S. Cl. X.R.

106—38.6, 230, 272